UNITED STATES PATENT OFFICE.

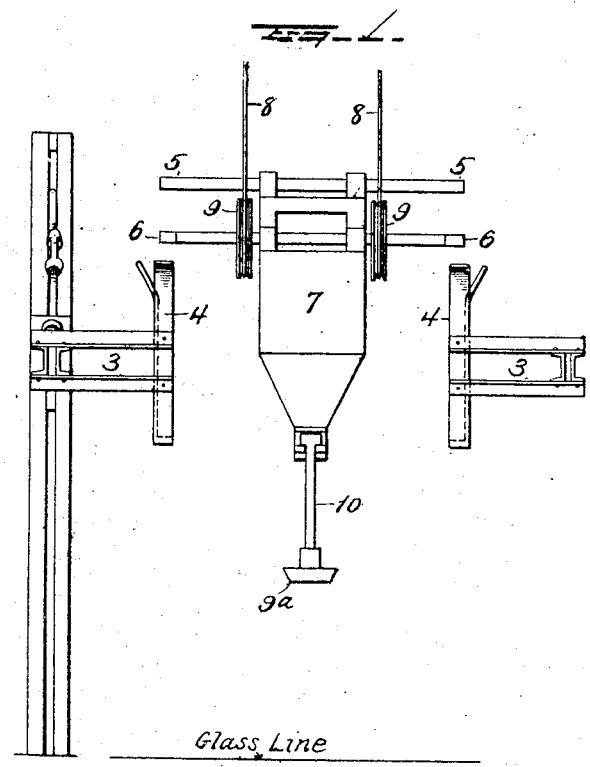
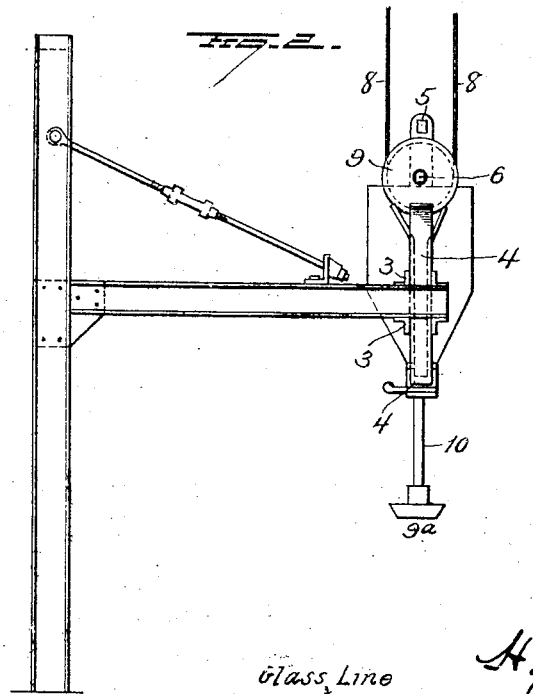

HUGO J. WALTER, OF BRADFORD, PENNSYLVANIA, ASSIGNOR TO CONSOLIDATED MACHINE COMPANY, OF BRADFORD, PENNSYLVANIA.

APPARATUS FOR DRAWING GLASS CYLINDERS.

1,329,065.  Specification of Letters Patent.  Patented Jan. 27, 1920.

Application filed March 19, 1919.  Serial No. 283,526.

*To all whom it may concern:*

Be it known that I, HUGO J. WALTER, a citizen of the United States and a resident of Bradford, in the county of McKean and State of Pennsylvania, have invented certain new and useful Improvements in Apparatus for Drawing Glass Cylinders; and I do hereby declare the following to be a full, clear, and exact description of the invention, such as will enable others skilled in the art to which it appertains to make and use the same.

My invention relates to an improvement in apparatus for drawing glass cylinders and is designed particularly for use with the type of apparatus wherein the bait cage is suspended from a flexible hoist cable and is free to be moved laterally in any direction. With such apparatus the bait cage being supported by a cable or cables, is unrestrained as to lateral or swinging movements hence the bait is liable to enter the glass off center or be moved to one side as it enters or leaves the glass.

The object of my invention is to provide means for holding the cage against any lateral movement as the bait approaches and enters the glass and also during the first part of the lifting movement of the cage, bait and attached glass cylinder, and it consists in guides located above the receptacle containing the glass and arms projecting from the cage and adapted to engage said guides whereby the cage and bait will be held against lateral or swinging movement as the bait enters and leaves the glass.

In the accompanying drawing; Figure 1 is a view in elevation of my improvement, the cage being in a position with its steadying arms above the guides and Fig. 2 is a view in side elevation of the same.

3 represents horizontal supports which are secured at the outer ends to the frame work of the drawing apparatus. These supports 3 are located at opposite sides of the drawing opening in the tank, or at opposite sides of the pot from which the cylinder is drawn, and carry at their inner or adjacent ends the guides 4. These guides are simply channels, preferably closed at their lower ends and flared at their upper ends so as to engage the arms 5 and 6 projecting from opposite sides of the cage 7 and direct them into the grooves. The ends of these arms are designed to have a close sliding fit in the grooves of the guides so as to prevent any sidewise or swinging movement in the direction of the length of the arms, or in any other direction.

The cage 7 is provided at its sides with sheaves 9 around which the hoist cables 8 pass, the said cables being connected with the drum of a hoist engine not shown, in the usual manner.

The guides and the arms 5 and 6, are so located that when the ends of the arms are within the guides, the bait $9^a$ at the lower end of pipe 10 will be in proper position to enter the glass and will be so held while entering the glass and for the first part of the lifting movement. The blow pipe 10 is detachably connected with the cage in the usual and well known manner. The guides are preferably closed at their lower ends to limit the descent of the cage and its suspended bait by the contact of the ends of arms 6 with the closures at the bottoms, but are of such length and so located with reference to the glass, that the bait may always be lowered into the glass irrespective of variations in the level of the latter, and are designed simply to prevent any movement of the cage or the bait other than a vertical movement just before the bait enters the glass, and while it is in or is leaving the glass.

After the cylinder has been started, the arms 5 and 6 pass out of the guides and are free and unrestrained during the remainder of the upward drawing movement. After the cylinder has been drawn it is severed from the glass in the bath and taken down and deposited on a horse in the usual and well known manner. During the taking down movement the cage and its arms are pulled outwardly so that they pass down out of the vertical plane of the guides, and after the blow pipe 10 with the glass cylinder attached thereto has been disconnected from the cage, and another pipe attached, the cage is lifted to carry its lower arms 6 above the tops of the guides and is then lowered as explained until the bait enters the glass after which another cylinder is drawn.

With this improvement I secure the desired flexibility of the hoisting means during the taking down operation, but lock the cage and bait against any lateral or swaying motion just before, and while the bait is entering and leaving the glass.

Having fully described my invention what I claim as new and desire to secure by Letters-Patent, is:—

1. In apparatus for drawing glass cylinders, wherein the bait is flexibly suspended from hoist cables, means located above the glass for engaging the bait carrying means just prior to the entry of the bait into the glass and for holding the bait against all lateral or swaying movement while entering and leaving the glass, the major part of the cylinder being drawn with the bait flexibly suspended.

2. In apparatus for drawing glass cylinders, wherein the bait is flexibly suspended on a hoist cable, means located above the glass for engaging the bait carrying means just prior to the entry of the bait into the glass for centering the bait with relation to the glass and for holding it against lateral movement while entering and leaving the glass, a part of the cylinder being drawn with the bait flexibly suspended.

3. In apparatus for drawing glass cylinders, wherein the bait is flexibly suspended from a hoist cable, means located above the glass for engaging the bait carrying means for holding the bait against any lateral movement while the latter is in the glass bath, the bait being free and unsupported against lateral movement while the major part of the cylinder is being drawn.

4. In apparatus for drawing glass cylinders, the combination of bait carrying means having projections at its sides, a bait, a flexible hoist cable for the bait carrying means and guides located above the glass bath and in position to engage the projections at the sides of the bait carrying means whereby the bait will be held against lateral or swaying movement while entering and leaving the glass but free to be moved laterally while a part of the cylinder is being drawn.

5. In apparatus for drawing glass cylinders, the combination of bait carrying means having projections at its sides, a bait, a flexible hoist cable for the bait carrying means and grooved guides closed at their lower ends and located above the glass bath and in a position to receive the projections at the sides of the bait carrying means whereby the bait will be held against lateral or swaying movements while entering and leaving the glass but free to be moved laterally after the said projections have passed above the guides and before the drawing of the cylinder has been completed.

In testimony whereof, I have signed this specification in the presence of two subscribing witnesses.

HUGO J. WALTER.

Witnesses:
W. C. PURPLE,
W. E. BURDICK.